United States Patent [19]

Sizer, II

[11] Patent Number: 4,737,958
[45] Date of Patent: Apr. 12, 1988

[54] HIGH REPETITION RATE LASER SOURCE HAVING HIGH POWER

[75] Inventor: Theodore Sizer, II, Middletown Township, Monmouth County, N.J.

[73] Assignee: American Telephone and Telegraph Company, AT&T Bell Laboratories, Murray Hill, N.J.

[21] Appl. No.: 854,081

[22] Filed: Apr. 21, 1986

[51] Int. Cl.$^4$ .............................................. H01S 3/098
[52] U.S. Cl. ...................................... 372/18; 372/25; 372/94
[58] Field of Search ............... 372/39, 18, 94, 25, 372/700; 350/162.12, 174

[56] References Cited

U.S. PATENT DOCUMENTS

| | | | |
|---|---|---|---|
| 3,879,109 | 4/1975 | Thomas | 350/174 |
| 4,061,985 | 12/1977 | Siebert | 372/57 |
| 4,205,278 | 5/1980 | George et al. | 378/57 |
| 4,422,046 | 12/1983 | Mumola et al. | 372/94 |
| 4,655,547 | 4/1987 | Heritage et al. | 350/162.12 |

OTHER PUBLICATIONS

Washio et al., "Room Temp. CW Operation of an Eff. Minat. Nd:YAG Laser End-Pumped by a SL Diode", Appl. Phys. Lett., 29(11), Dec. 1, 1976.
Zhou et al., "Effic. Freq-Stable Laser-Diode Pumped Nd:YAG Laser"; Opt. Lett. 10(2), Feb. 1985.
Goldberg et al., "Injecton Locking of Coupled-Stripe Diode Laser Arrays"; Appl. Phys. Lett. 46(3), Feb. 1, 1985.
*Applied Optics,* Diode-Laser-Pumped Nd:YAG Laser Injection Seeding System, by Randal L. Schmitt and Larry A. Rahn, Mar. 1986, vol. 25, No. 5.
*Electron,* 20 GHz Active Mode-Locking of a 1.55 μm InGaAsP Laser, by R. S. Tucker, S. K. Korotky, G. Eisenstein, U. Koren, L. W. Stulz, J. J. Veselka, Feb. 15, 1985.
*Journal Applied Physics,* ND:YAK Regenerative Amplifier, by J. E. Murray and W. H. Lowdermilk, pp. 3548 to 3555, Jul., 1980.

*Primary Examiner*—Leon Scott, Jr.
*Attorney, Agent, or Firm*—Patrick E. Roberts; Gregory C. Ranieri

[57] ABSTRACT

Pulses from a first laser source (10) at a predetermined high repetition rate are passed through an isolator (38), a mode-matched with an amplifier and then temporally multiplexed to a predetermined high repetition rate. The high repetition rate pulses (63) are then injected into a second source (70) where they are amplified to derive a stream (79) of high power pulses at the predetermined high repetition rate and then selectively released.

3 Claims, 3 Drawing Sheets

HIGH REPETITION RATE LASER SOURCE HAVING HIGH POWER

TECHNICAL FIELD

This invention relates to lasers and, in particular, to laser sources which produce a stream of pulses having high power at a high repetition rate.

BACKGROUND OF THE INVENTION

In optical communication systems, the speed at which information is transmitted is limited by the pulse rate of the source. The pulse rate has been increased to about 20 GHz by the use of mode-locking laser diodes.

Likewise, the clock rate limits the speed of optical computing. Unlike optical communication systems, however, the same mode-locked laser diodes cannot be used alone to increase the clock rate in optical computing. This is so because optical computing requires, in addition to computing speed, high average power to acces a large number of parallel operations simultaneously. The many separate logical elements must be driven from a single clock source. The problem with the prior art is the lack of a laser source which produces high power pulses at a high repetition rate.

SUMMARY OF THE INVENTION

The aforesaid problem is solved by multiplexing laser pulses to a predetermined high repetition rate and then amplifying the pulses by a method known as injection mode-locking to boost the power of the pulses to a predetermined level.

More particularly, in a first embodiment, an oscillator produces a stream of laser pulses which are spatially filtered, isolated and then mode-matched with an amplifier. The mode-matched pulse stream is then temporally multiplexed before being amplified to derive the desired output stream.

The amplifier used in this invention differs from known regenerative amplifiers in many ways. First, in this invention, a continuous wave (cw) pulse stream is injected into the amplifier cavity to derive an output pulse stream of about 22 GHz. In known amplifiers, a single pulse is injected into an amplifier cavity and then dumped out at the rate of 1 kHz. Whereas known regenerative amplifiers have elements which suppress lasing before the single pulse is injected into the amplifier cavity, Q-switching, the amplifier of the present invention needs no such special equipment. In this invention, no special equipment is needed. In known aplifiers, expensive equipment, such as Pockels cells, is needed.

In a second embodiment of this invention, a laser diode and a mode-matching lens are used to generate the aforesaid predetermined high repetition rate of laser pulses which is then amplified in the aforesaid novel injection mode-locking amplifier to derive the predetermined level of power.

Solid state lasers such as Nd:YAG and Nd:YLF are used because of their ruggedness, ease of operation and high average power.

This invention is advantageous over the prior art because a source of pulses is provided at a high repetition rate in the order of 22 GHz and a high power level of about 10 watts. This source is essential in optical computing because the high repetition pulse rate provides the high clock rate and the high power provides access to a large number of parallel operations at once.

This invention will find use also in communications applications because it will provide a high repetition rate source of coherent near Fourier transform limited pulses. For coherent optical communications schemes, the chirped non-Fourier transform limited operation present in the distributed-feedback diode lasers used in a detriment. A source such as the present invention would provide a much more attractive source at the same high repetition rate.

Another use for the present invention resides in sampling systems such as electro-optic sampling which would use the ultra-high repetition rate to average more shots and as such achieve even higher resolution.

DETAILED DESCRIPTION

Figure 2:
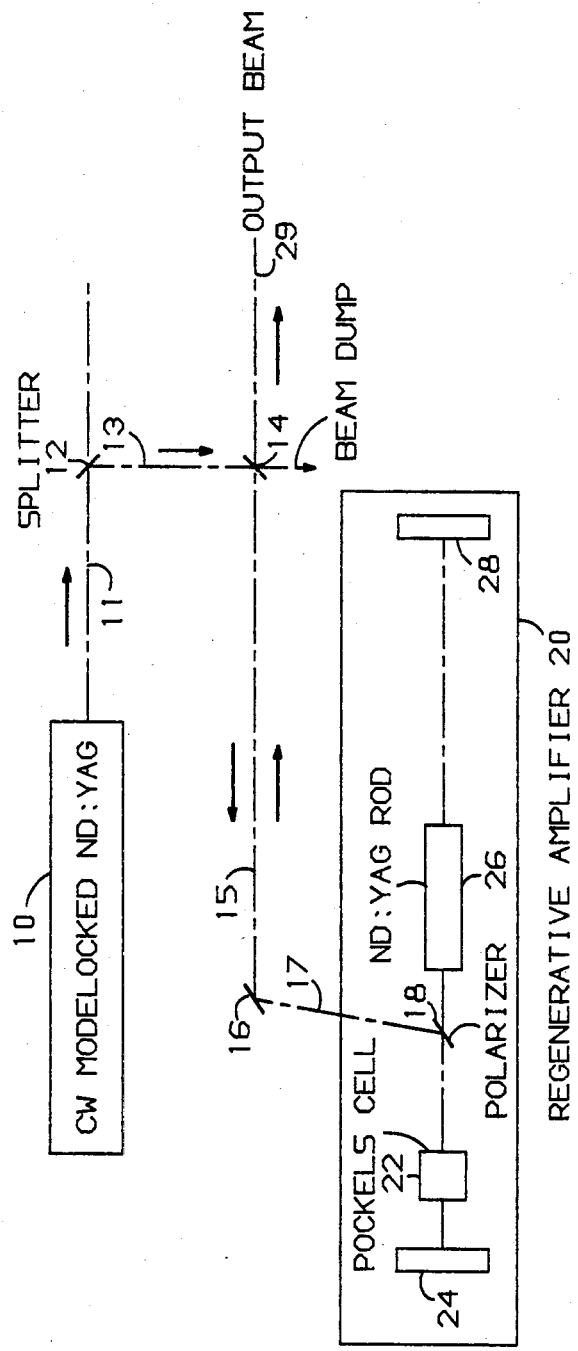
FIG. 2 shows a prior art regenerative amplifier.

Referring to FIG. 2, there is shown a prior art apparatus for producing a stream of pulses at a repetition rate of about 100 MHz. The apparatus has a continuous wave mode-locked Nd:YAG laser source 10 such as one made by the Quantronix Corporation. Source 10 is sometimes called a laser oscillator because short optical pulses at a relatively high repetition rate are generated therefrom. Source 10 produces pulses every 10 nano seconds (ns), each about 100 pico seconds (ps) long. The stream of pulses from source 10 is selectively reflected from 10% splitter 12 and one beam therefrom along path 13 is reflected from 4% reflector 14. The stream of pulses from reflector 14 is injected into regenerative amplifier 20 after being reflected from element 16. The stream of pulses 17 is incident on polarizer 18 which is located within amplifier cavity 20. Amplifier 20 is called a regenerative amplifier. Regenerative amplifiers differ from oscillators in that the power of a laser pulse, or a stream of pulses, can be amplified by the former. See, for example, FIG. 11.8 at page 147 of a book entitled, "Understanding Laser Technology" by C. Breck Hitz, published by the PennWell Co.

The light received within regenerative amplifier 20 is passed through Pockels cell 22 and then amplified by being bounced back and forth between the two mirrors 24 and 28 via laser rod 26 which is fabricated from Nd:YAG. Nd:YAG refers to a compound comprising three parts of Yttrium, five parts of Aluminum and twelve parts of Garnet which is doped with trivalent Neodymium ions. See, for example, section 2.3.5 of a book entitled, "Mode-Locking in Solid-State and Semiconductor Lasers" by M. S. Demokan, published by Research Studies Press. The stream of pulses which has been amplified is then returned along paths 17, 15 and 29 to be used for any desired application in the prior art.

Figure 1:
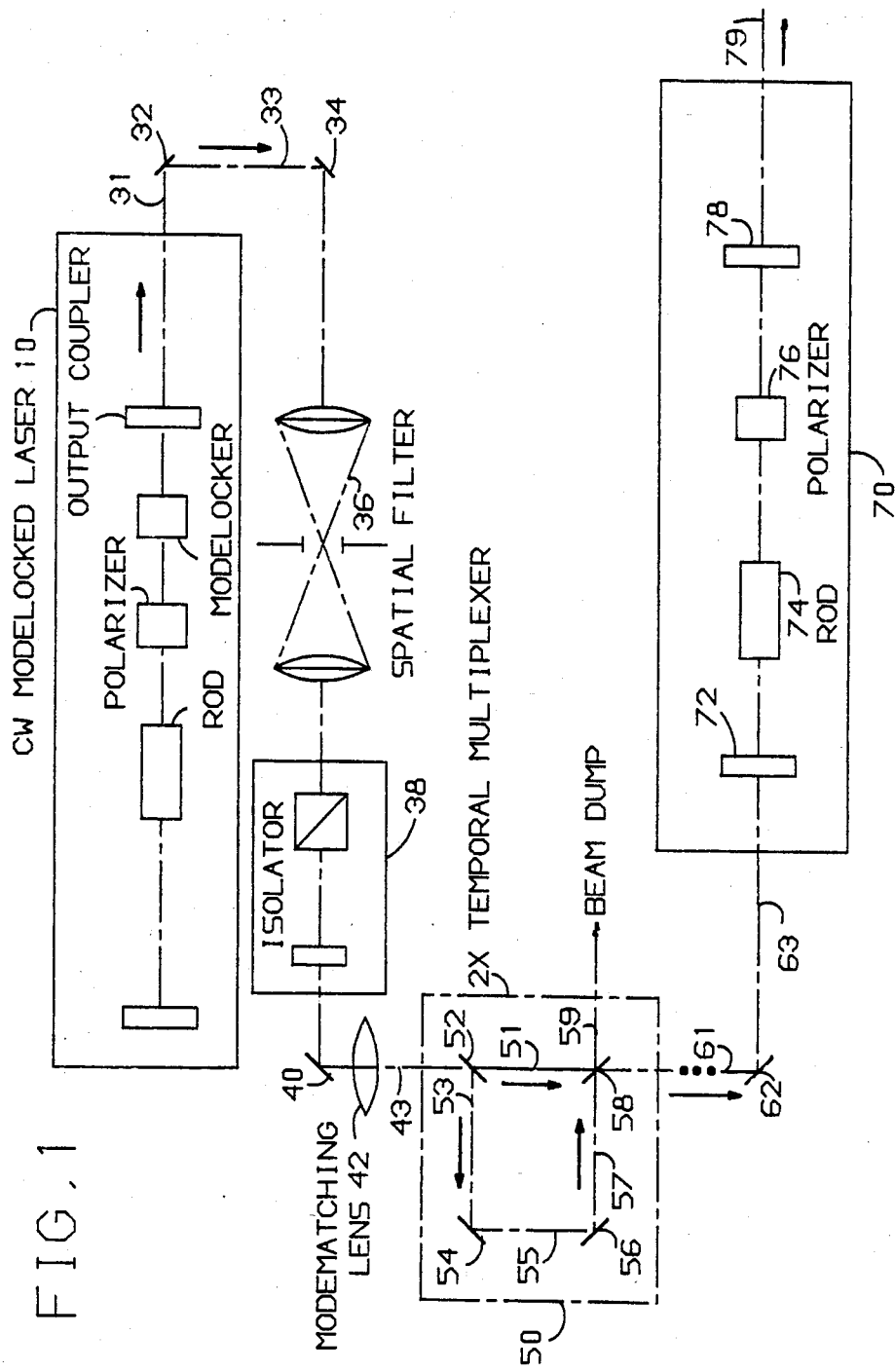
FIG. 1 shows one embodiment of the present invention.

Referring to FIG. 1, there is shown a first embodiment of the present invention comprising laser source 10. Source 10, similar to source 10 of FIG. 2, is an oscillator which produces pulses at the rate, for example, of about 100 MHz and 10 Watts. That is, source 10 is a continuous wave (CW) mode-locked Nd:YAG laser. The output stream of pulses 31 from source 10 is reflected at elements 32 and 34. There may be several beams obtained from reflector 32 and directed to many different regeneration amplifiers to be described below.

The reflected pulse stream from element 34 is filtered at special filter 36 and then passed through isolater 38. Isolator 38 absorbs any reflection of the pulse stream from elements downstream therefrom and prevents the pulse stream from returning to laser source 10 so as to avoid damage thereto.

The stream of pulses from the output of isolator 38 is then reflected by element 40 into mode-matching lens 42 which functions to focus the stream of laser pulses from source 10 into reflector 52 which is located within multiplexer 50.

A novel feature of this invention comprises the use of many serially located temporal multiplexers, such as multiplexer 50, to increase the frequency of the pulse stream from about 100 MHz, as in stream 31, to about 22 GHz or any other desired high frequency. Referring to multiplexer 50, there is shown a device for multiplexing by pulse stacking using many beam splitters. Thus, the pulse stream 43 which enters splitter 52, a 50% splitter in this embodiment, is split into two paths 51 and 53. The pulse stream 53 is reflected at elements 54 and 56 and then returned to 50% splitter 58 where the two pulse streams are stacked, or combined, to produce a pulse stream at twice, in this embodiment, the frequency of the pulse stream which enters multiplexer 50. The multiplexed pulse stream is split at element 58 into two streams: a stream 59, the use for which is not shown herein, and a second stream 61 which is multiplexed at other multiplexers, not shown in FIG. 1 for convenience in drawing, similar to element 50 to derive a desired frequency and then delivered after reflection at element 62 to a high power high regeneration laser source (HPHRL) 70.

Although HPHRL source 70 performs injection mode-locking, there are some differences from a traditional regenerative amplifier, such as the one shown in FIG. 2. Referring to FIG. 1 again, first, the pulse stream 63 is selectively received by reflector 72. The received stream is then passed sequentially through rod 74, which is selected from a group of materials including Nd:YAG and Nd:YLF, polarizer 76 and reflector 78. Reflector 78 selectively permits a predetermined percentage of the pulse stream 77 incident thereon to leave HPHRL source 70 as the output pulse stream 79. The stream of laser pulses derived from HPHRL source 70 has a repetition rate of about 22 GHz at about 10 Watts in the preferred embodiment and finds use in optical computing as the clock pulse. This is possible because the high power of about 10 Watts permit the clock to be used for parallel operations.

An Nd:YAG rod 74 may provide pulses as short as 10 ps. Even shorter pulses, such as one pico second, may be obtained by using Neodymium: Yttrium Lithium Fluoride (Nd:YLF) as the material for rod 74.

Several significant differences between HPHRL source 70 and rgenerative amplifier 20 will now be enumerated. HPHRL source 70 is a quasi continuous wave source, that is, a steady continuous stream of pulses at a high repetition rate, about 22 GHz, is produced. By contrast, regenerative amplifier 20 of FIG. 1 provides a single pulse at a rate up to about 1 KHz. Next, regenerative amplifier 20 has internal cavity elements to suppress lasing before the single phase is injected and thereby Q-switches the amplifier. HPHRL source 70 does not require these elements. For Q-switching, see for example, the aforesaid Hitz book at page 139 et seq. Regenerative amplifier 20 requires an expensive Pockels cell 22 to inject the source pulse into the amplifier cavity and then to dump the output pulse after it has been amplified from the cavity. HPHRL source 70 does not require a Pockels cell.

As stated hereinabove, lens 42 performs mode-matching. The repetition rate of source 10 is matched with an integral multiple of the cavity frequency of HPHRL source 70. For example, a HPHRL cavity with a round trip time of 10 nano seconds can be matched to a source which provides a pulse every nano second. Thus, when provided with a pulse every nano second, HPHRL source will support this pulse and give an output equivalent to that input but with additional power.

There is a requirement on laser source 10 that it produce pulses with a wavelength in the acceptance range of HPHRL source 70. For HPHRL 70 with a Nd:YAG rod 74, source 10 should generate pulses with a wavelength of either 1.064 micrometer or 1.3 micrometer.

Figure 3:
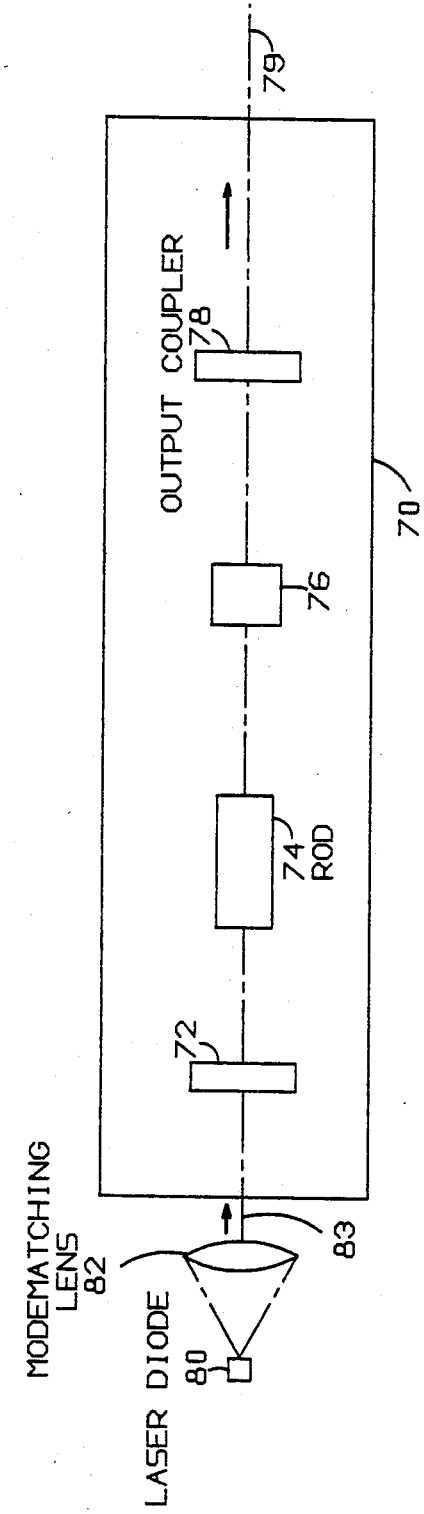
FIG. 3 shows a second embodiment of the present invention.

Referring to FIG. 3, there is shown a second embodiment of the present invention. A stream of laser pulses 83 are produced from a combination of laser diode 80 and mode-matching lens 82. Pulse stream 83 is delivered to HPHRL source 70 which has been described hereinbefore with reference to FIG. 1. The advantage of the laser diode of FIG. 3 over the mechanism of FIG. 1 is that fewer elements are required for the laser diode source. Furthermore, a laser diode source can be fabricated to produce any high frequency pulse stream. The power of the pulse stream, however, must be increased from about as low as 10 femto joules to about 10 watts for optical computing.

There are advantages of using solid state laser such as Nd:YAG and Nd:YLF. These are their ruggedness, ease of operation and high average power.

What is claimed is:

1. Apparatus for producing optical pulses comprised of
   a source of optical pulses, said optical pulses occurring at a first repetition rate,
   means coupled optically to said source for pulsed stacking the pulses from said source to produce a pulse stream at a second repetition rate, said second repetition rate being greater than said first repetition rate, and
   means into which said pulse stream from said means for pulse stacking is injected for amplifying the level of said pulse stream to a predetermined power level, said means for amplifying including means for defining an optical resonator and a gain medium positioned within said optical resonator so that a cavity frequency is defined therefor, said first repetition rate being integrally related to said cavity frequency.

2. The apparatus of claim 1 wherein said means for amplifying is further comprised of
   first reflector means for receiving the pulse stream from said means for pulse stacking,
   a gain medium comprised of a rod made from a composition chosen from the group consisting of Nd:YAG and Nd:YLF,
   a polarizer, and
   a second reflector means for selectively transmitting said pulse stream at said predetermined power level, said first and second reflector means defining an optical cavity resonator therebetween, said polarizer positioned adjacent to said gain medium within said optical cavity resonator.

3. The apparatus of claim 1 wherein said means for pulse stacking further includes
   a plurality of means for pulse stacking, each arranged in series optical connection, one with the other, and each producing a pulse stream having a repetition rate exceeding the repetition rate of the stream received at its input by a fixed number.

* * * * *